(12) United States Patent
Miki et al.

(10) Patent No.: US 9,440,703 B2
(45) Date of Patent: Sep. 13, 2016

(54) CLAMP ASSEMBLY FOR FIXING HANDLEBAR GRIP

(75) Inventors: Yoshimitsu Miki, Osaka (JP); Kazutaka Fukao, Osaka (JP); Kentaro Kosaka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/329,679

(22) Filed: Dec. 19, 2011

(65) Prior Publication Data

US 2013/0152726 A1      Jun. 20, 2013

(51) Int. Cl.
*B62K 21/26* (2006.01)
*F16B 2/10* (2006.01)
*F16B 7/14* (2006.01)
*B62J 99/00* (2009.01)

(52) U.S. Cl.
CPC ............... *B62K 21/26* (2013.01); *F16B 2/10* (2013.01); *F16B 7/1418* (2013.01); *B62J 2099/0033* (2013.01); *Y10T 74/20828* (2015.01)

(58) Field of Classification Search
CPC ...... B62K 21/26; B62K 11/14; B62K 23/00; B62K 23/02; B62K 21/16; Y10T 74/20828; Y10T 74/20822; Y10T 74/20438; Y10T 74/2078; F16B 2/10; F16B 7/1418; B62J 2099/0033
USPC .......... 74/551.8, 551.9, 557, 558, 558.5, 49, 74/502.2, 551.1; 280/288.4; 403/191, 234, 403/235, 290
See application file for complete search history.

(56) References Cited

U.S. PATENT DOCUMENTS

| | | | |
|---|---|---|---|
| 6,035,742 A | 3/2000 | Hollingsworth et al. | |
| 6,263,759 B1 | 7/2001 | Hollingsworth et al. | |
| 6,305,237 B1 * | 10/2001 | Ichida | 74/473.11 |
| 6,474,747 B2 * | 11/2002 | Beaulieu et al. | 30/296.1 |
| 7,832,531 B2 * | 11/2010 | Hirose | B62K 23/06 188/24.22 |
| 8,061,667 B2 | 11/2011 | Weiss et al. | |
| 9,073,596 B2 * | 7/2015 | McLaughlin | B62K 19/30 |
| 2003/0226420 A1 * | 12/2003 | Oi et al. | 74/551.1 |
| 2007/0199401 A1 * | 8/2007 | Kawakami et al. | 74/502.2 |
| 2007/0295150 A1 * | 12/2007 | Lai | 74/551.9 |
| 2008/0307923 A1 * | 12/2008 | Lai | 74/551.8 |
| 2010/0139442 A1 | 6/2010 | Tsumiyama | |
| 2011/0083525 A1 * | 4/2011 | Hirose et al. | 74/501.6 |
| 2011/0253863 A1 | 10/2011 | Weiss et al. | |
| 2014/0026710 A1 * | 1/2014 | Takeuchi | B62K 23/06 74/551.8 |
| 2015/0096403 A1 * | 4/2015 | Hirotomi | B62K 23/06 74/491 |

FOREIGN PATENT DOCUMENTS

| | | |
|---|---|---|
| CN | 1171351 A | 1/1998 |
| CN | 2863622 Y | 1/2007 |
| EP | 2 196 385 A1 | 6/2010 |
| GB | 190114768 A * | 7/1902 |
| TW | M301837 U | 12/2006 |
| TW | M329602 U | 4/2008 |
| TW | M359486 U | 6/2009 |

\* cited by examiner

*Primary Examiner* — Adam D Rogers
(74) *Attorney, Agent, or Firm* — Global IP Counselors

(57) ABSTRACT

A clamp assembly is provided for fixing a handlebar grip to a handlebar. The clamp assembly has a fixing member that is configured to be mounted on the handlebar. The fixing member has at least one mating grip locking structure and a component attachment structure.

16 Claims, 6 Drawing Sheets

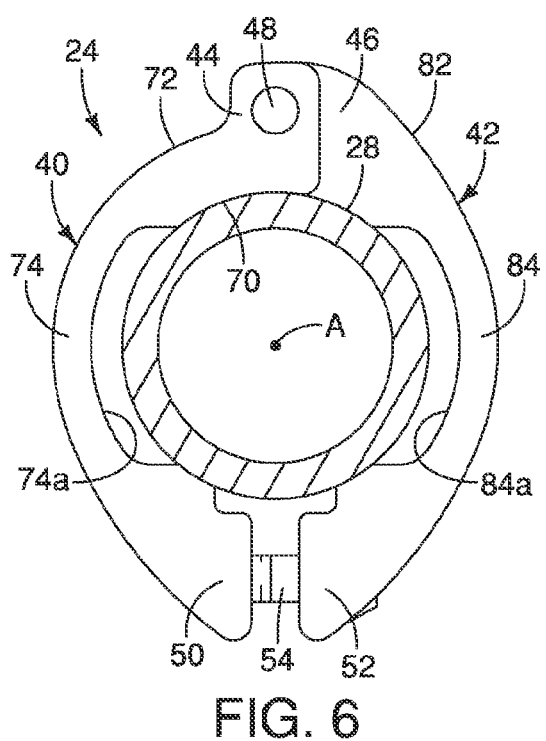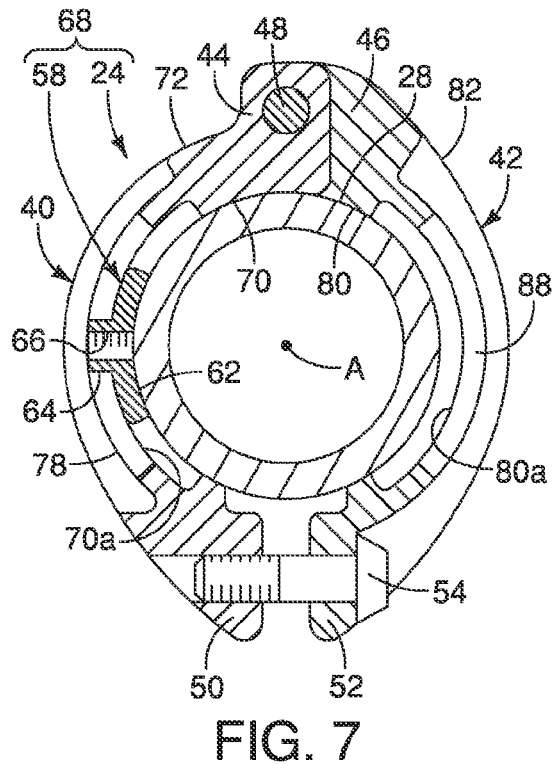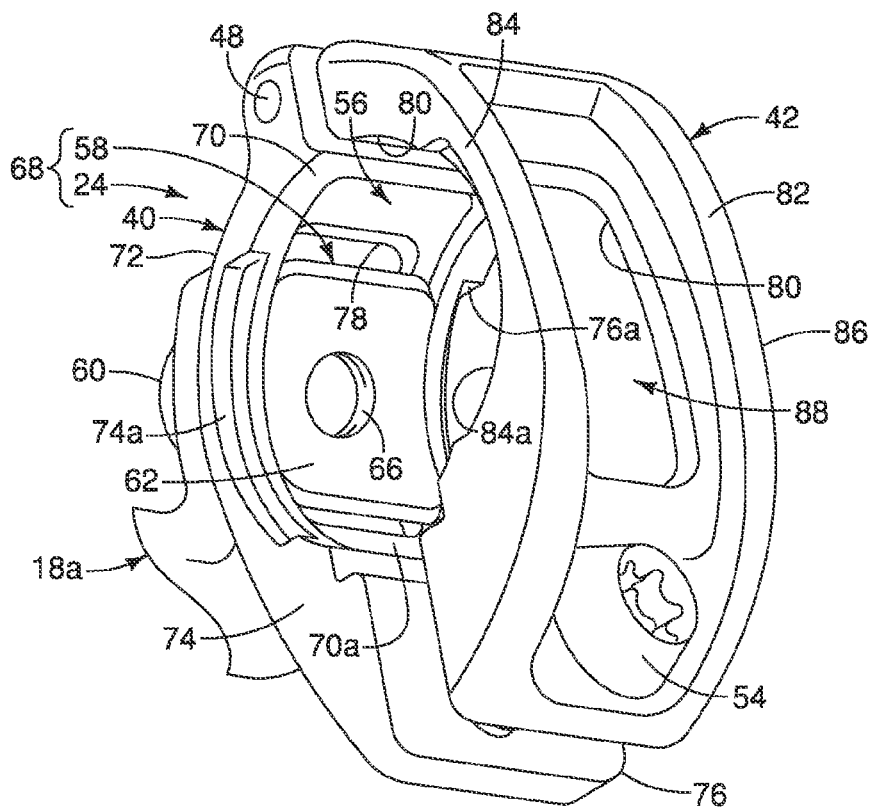

US 9,440,703 B2

CLAMP ASSEMBLY FOR FIXING HANDLEBAR GRIP

BACKGROUND

1. Field of the Invention

This invention generally relates to a clamp assembly. More specifically, the present invention relates to a clamp assembly that is used to secure a handlebar grip to a bicycle handlebar and also support a component on the bicycle handlebar.

2. Background Information

Bicycle, motorcycles, all-terrain vehicles (ATVs), personal watercrafts and snowmobiles typically have a handlebar with a pair of handlebar grips for a rider to more comfortably grip the handlebar. The handlebar grips are secured to the handlebar such that they do not move on the handlebar. Sometimes the handlebar grips are glued to the handlebar so that they do not move on the handlebar. In recent years, various proposals have been made to prevent the handlebar grips from moving on the handlebar. For example, a lock-on grip system has been developed for securing handlebar grips onto a handlebar.

Also bicycle, motorcycles, all-terrain vehicles (ATVs), snowmobiles and personal watercrafts are often provided with various components that are mounted on the handlebar. In the case of a bicycle, the handlebar often has a pair of brake levers and a pair of shifters mounted on the handlebar. The brake levers and the shifters are typically mounted adjacent the inner ends of the handlebar grips.

SUMMARY

One aspect of the present disclosure is to provide a clamp assembly that is used to secure a handlebar grip to a handlebar and also support a component on the handlebar.

In view of the state of the known technology, a clamp assembly is provided for fixing a handlebar grip to a handlebar. The clamp assembly comprises a fixing member that is configured to be mounted on the handlebar. The fixing member has at least one mating grip locking structure and a component attachment structure.

These and other objects, features, aspects and advantages of the disclosed clamp assembly will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 6 is an enlarged end elevational view of one of clamp assemblies installed on the right grip portion of the handlebar with the handlebar grip removed;

FIG. 7 is an enlarged transverse cross sectional view of one of clamp assemblies installed on the right grip portion of the handlebar with the handlebar grip removed;

FIG. 8 is an enlarged perspective view of the clamp assembly of the right bicycle grip assembly illustrated in FIGS. 1 to 5;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
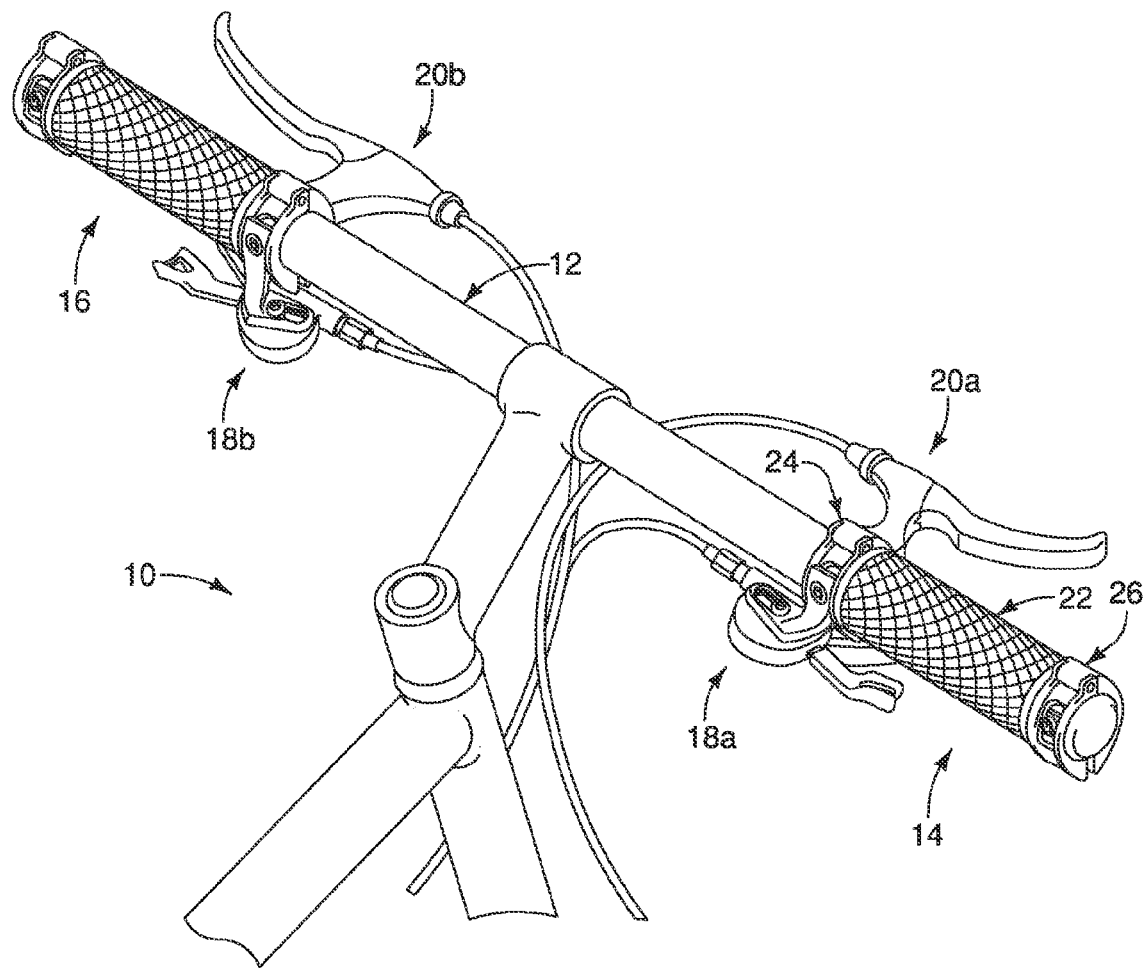
FIG. 1 is a perspective view of a portion of a bicycle in the area of the handlebar, with the handlebar being equipped with a pair of bicycle grip assemblies in accordance with a first embodiment.
Figure 2:
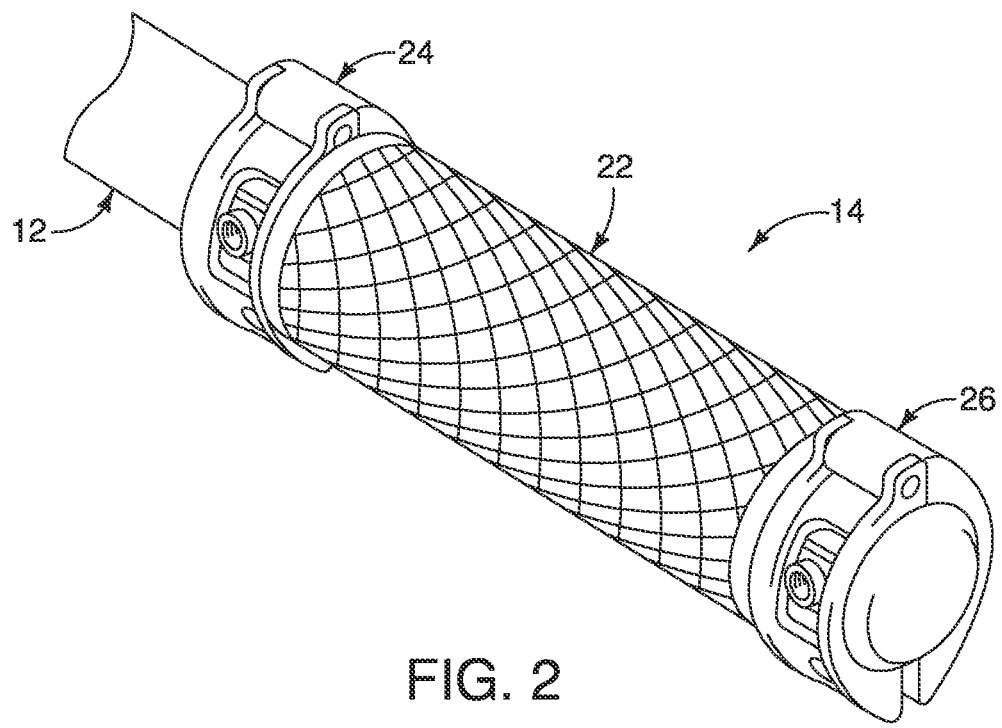
FIG. 2 is an enlarged rear perspective view of the right grip portion of the handlebar and the right bicycle grip assembly illustrated in FIG. 1, with the handlebar grip secured to the handlebar by two clamp assemblies in accordance with the first embodiment.
Figure 3:
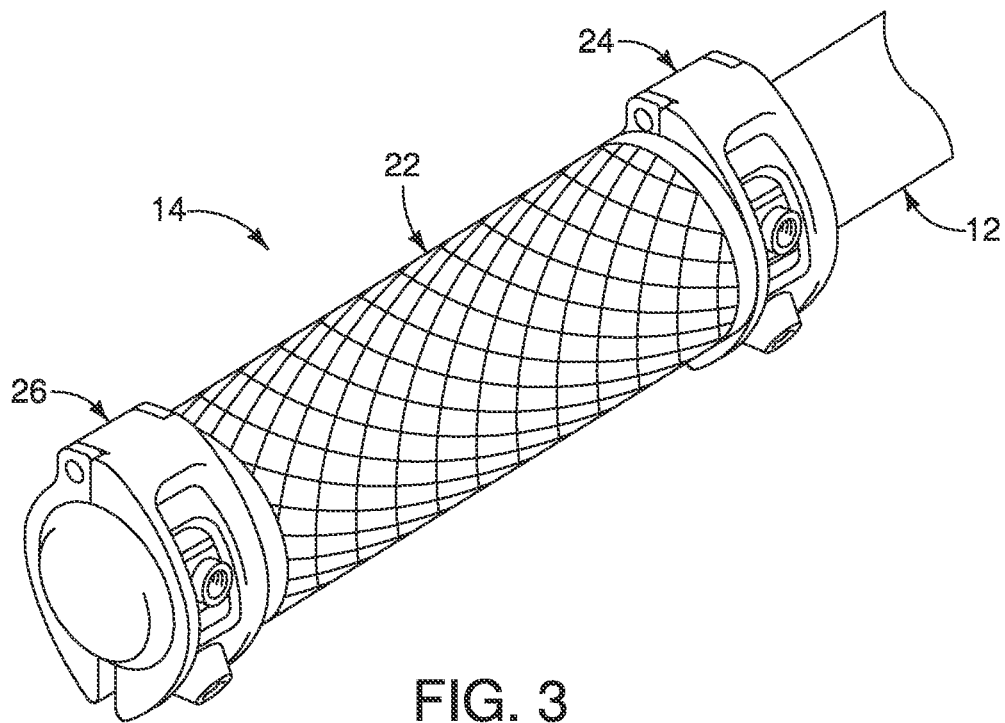
FIG. 3 is an enlarged front perspective view of the right grip portion of the handlebar and the right bicycle grip assembly illustrated in FIG. 1, with the handlebar grip secured to the handlebar by two clamp assemblies in accordance with the first embodiment.

Referring initially to FIG. 1, a portion of a bicycle 10 is illustrated with a bicycle handlebar 12 that is equipped with a pair (right and left) of bicycle grip assemblies 14 and 16 in accordance with a first embodiment. Each of the grip assemblies 14 and 16 is designed to separately support four bicycle components on the handlebar 12. In FIG. 1, the right grip assembly 14 supports a shifter lever unit 18a and a brake lever unit 20a, while the left grip assembly 16 supports a shifter lever unit 18b and a brake lever unit 20b. Since the grip assemblies 14 and 16 are identical, except that they are installed on opposite ends of the handlebar 12, only the right grip assembly 14 will be discussed in further detail herein. Also, the grip assemblies 14 and 16 are not limited to being used with a bicycle. Rather, the grip assemblies 14 and 16 can be used with other vehicles that have a handlebar.

Referring now to FIGS. 2 to 8, the right grip assembly 14 will now be discussed in more detail. The right grip assembly 14 basically includes a handlebar grip 22 and a first fixing member 24. Preferably, the right grip assembly 14 further includes a second (additional) fixing member 26. The fixing members 24 and 26 are each configured to be removably mounted onto a right grip portion 28 of the handlebar 12 to secure the handlebar grip 22 to the right grip portion 28. In the first illustrated embodiment, the handlebar 12 has a center handlebar axis that is coincident with the center handlebar mounting axes A (FIGS. 4 and 5) of the handlebar grip 22 and the first and second fixing members 24 and 26.

In the first illustrated embodiment, the first fixing member 24 constitutes an inner fixing member, while the second fixing member 26 constitutes an outer fixing member. Thus, the first fixing member 24 secures an inner end of the handlebar grip 22 to the handlebar 12, while the second fixing member 26 secures an outer end of the handlebar grip 22 to the handlebar 12.

As seen in FIG. 1, the second (additional) fixing member 26 is not being illustrated as supporting a bicycle component. However, the second (outer) fixing member 26 can be configured to support two bicycle components in the same manner as the first (inner) fixing member 24. For example, a mirror could be mounted on the second fixing member 26 if needed and/or desired. Of course, a variety of bicycle components can be mounted on the second fixing member 26 if needed and/or desired. The first and second fixing members 24 and 26 are identical to each other. Thus, for the sake of brevity, only the first fixing member 24 will be discussed in detail herein. However, the outer fixing member 26 can be replaced with a conventional fixing member as needed and/or desired Referring now to FIGS. 4 and 5, the handlebar grip 22 is concentrically arranged around the handlebar 12. The handlebar grip 22 is installed over a right grip portion 28 of handlebar 12, and then affixed to the right grip portion 28 of handlebar 12 by the first and second fixing members 24 and 26. Preferably, the handlebar grip 22 includes a first tubular portion 30 that has a first end 32 and a second end 34. Each of the first and second ends 32 and 34 includes at least one projection 36. In the first illustrated embodiment, each of the first and second ends 32 and 34 includes two of the projections 36. Each of the projections 36 constitutes a first mating grip locking structure. Preferably, the projections 36 are arc-shaped members. Of course, the number of the projections 36 (i.e., the first mating grip locking structures) can be fewer or more as needed and/or desired.

The handlebar grip 22 preferably further includes a second tubular portion 38 that is disposed over the first tubular portion 30. The second tubular portion 38 is preferably fabricated from a relatively soft elastomer. The second tubular portion 38 is softer and more flexible than the first tubular portion 30. On the other hand, the first tubular portion 30 is preferably a hard, rigid cylinder. For example, the first tubular portion 30 is preferably formed from a relatively durable, impact resistant polymer such as glass reinforced polypropylene. Of course, the first tubular portion 30 can have some flexibility. In any case, the first tubular portion 30 is more rigid than the second tubular portion 38. Thus, the first tubular portion 30 supports and provides rigidity to the second tubular portion 38.

Figure 4:
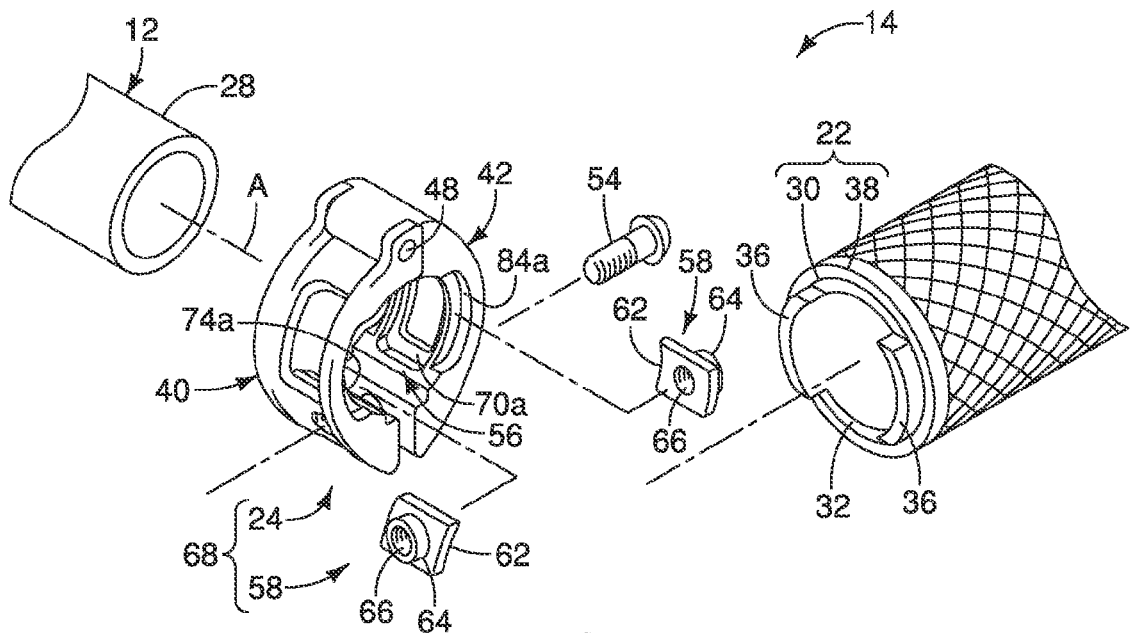
FIG. 4 is an exploded perspective view of part of the right bicycle grip assembly and the right grip portion of the handlebar illustrated in FIGS. 1 to 3.

Referring now to FIGS. 4 to 8, the first fixing member 24 will now be discussed in more detail. As mentioned above, the second fixing member 26 is identical to the first fixing member 24. Thus, the following description of the first fixing member 24 applies to the corresponding parts of the second fixing member 26. In the first illustrated embodiment, the first fixing member 24 basically includes a first semicircle part 40 and a second semicircle part 42. The first and second semicircle parts 40 and 42 have first ends 44 and 46 that are hinged together by a hinge pin 48. The first and second semicircle parts 40 and 42 have second ends 50 and 52 that are adjustably connected together by a fastener 54. Thus, the first and second semicircle parts 40 and 42, the hinge pin 48 and the fastener 54 define a tube clamp that squeezes the right grip portion 28 of the handlebar 12. In other words, the first and second semicircle parts 40 and 42, the hinge pin 48 and the fastener 54 of the fixing member 24 form an annular shape having an inner area 56 into which the handlebar 12 is disposed as seen in FIG. 4.

Figure 5:
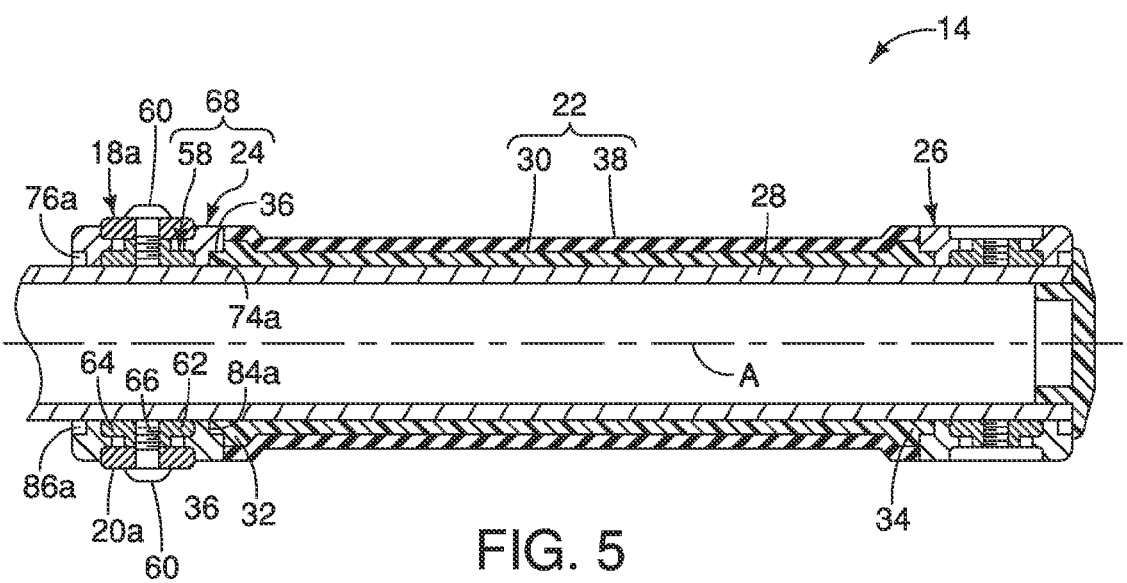
FIG. 5 is a longitudinal cross sectional view of the right bicycle grip assembly installed on the right grip portion of the handlebar illustrated in FIGS. 1 to 4.

As seen in FIGS. 4 and 5, a pair of component attachment structures 58 is arranged at the first fixing member 24. In the first illustrated embodiment, the component attachment structures 58 are in the form of nuts that receive fastening bolts 60, respectively. Each of the component attachment structures 58 preferably includes a base portion 62 and a component attachment portion 64. The component attachment portion 64 protrudes outwardly from the base portion 62 in a generally perpendicular direction from the base portion 62. Thus, the component attachment structures 58 have a generally hat-shaped configuration. A threaded hole 66 extends through the base portion 62 and the component attachment portion 64. The fastening bolts 60 are threaded into the threaded holes 66 for secure a bicycle component to the first fixing member 24. Preferably, the bicycle component is selected from a group consisting of a shifter lever unit, a brake lever unit, a suspension controller unit, an electric switch unit and a cycle computer unit.

The first fixing member 24 having the component attachment structures 58 constitutes a clamp assembly 68. While the component attachment structures 58 are illustrated as separate elements that are adjustably positioned relative to the first fixing member 24, the component attachment structures 58 can be integrally formed with the first fixing member 24. Also, while the first fixing member 24 is illustrated with two of the component attachment structures 58 being adjustably positioned relative to the first fixing member 24, only one of the component attachment structures 58 can be used if needed and/or desired.

The first semicircle part 40 is preferably formed of a hard, rigid from a suitable material such as a metallic material, as illustrated, or a hard, rigid non-metallic material. The first semicircle part 40 has an inner surface 70, an outer surface 72 and a pair of side edge surfaces 74 and 76. The base portion 62 of one of the component attachment structure 58 is slidably disposed along the inner surface 70 that partially forms the inner area 56.

The first semicircle part 40 of the fixing member 24 has an opening 78 extending between the inner surface 70 and the outer surface 72. The opening 78 is a circumferentially extending slot relative to the center handlebar mounting axis A of the fixing member 24. The component attachment portion 64 is aligned with the opening 78 and extends between the inner and outer surfaces 70 and 72 of the fixing member 24. In other words, the component attachment portion 64 is at least partially disposed in the opening 78. Thus, the component attachment structure 58 is movably disposed relative to the opening 78 of the fixing member 24 with the component attachment portion 64 being accessibly aligned at different positions through the opening 78.

The inner surface 70 of the fixing member 24 has a recess 70a that receives the base portion 62 of the component attachment structure 58. The recess 70a is dimensioned relative to the base portion 62 to limit rotational movement of the base portion 62 relative to the fixing member 24 about the component attachment portion 64. The side edge surface 74 includes a recess 74a, while the side edge surface 76 includes a recess 76a. Each of the recesses 74a and 76a constitutes a second mating grip locking structure that mates with one of the projections 36 (i.e.; the first mating grip locking structures) of the handlebar grip 22 to fix the handlebar grip 22 to the handlebar 12. Each recess being aligned with a respective opening along a direction parallel to the center handlebar mounting axis.

The second semicircle part 42 is preferably formed of a hard, rigid from a suitable material such as a metallic material, as illustrated, or a hard, rigid non-metallic material. The second semicircle part 42 has an inner surface 80, an outer surface 82 and a pair of side edge surfaces 84 and 86. The base portion 62 of one of the component attachment structure 58 is slidably disposed along the inner surface 80 that partially forms the inner area 56.

The second semicircle part 42 of the fixing member 24 has an opening 88 extending between the inner surface 80 and the outer surface 82. The opening 88 is a circumferentially extending slot relative to the center handlebar mounting axis A of the fixing member 24. The component attachment portion 64 is aligned with the opening 88 and extends between the inner and outer surfaces 80 and 82 of the fixing member 24. In other words, the component attachment portion 64 is at least partially disposed in the opening 88. Thus, the component attachment structure 58 is movably disposed relative to the opening 88 of the fixing member 24 with the component attachment portion 64 being accessibly aligned at different positions through the opening 88. The opening 88 of the second semicircle part 42 is circumferentially spaced apart from the opening 78 of the first semicircle part 40 in a circumferential direction relative to the center handlebar mounting axis A of the fixing member 24.

The inner surface 80 of the fixing member 24 has a recess 80a that receives the base portion 62 of the component attachment structure 58. The recess 80a is dimensioned relative to the base portion 62 to limit rotational movement of the base portion 62 relative to the fixing member 24 about the component attachment portion 64. The side edge surface 84 includes a recess 84a, while the side edge surface 86 includes a recess 86a. Each of the recesses 84a and 86a constitutes a second mating grip locking structure that mates with one of the projections 36 (i.e., the first mating grip locking structures) of the handlebar grip 22 to fix the handlebar grip 22 to the handlebar 12.

Figure 9:
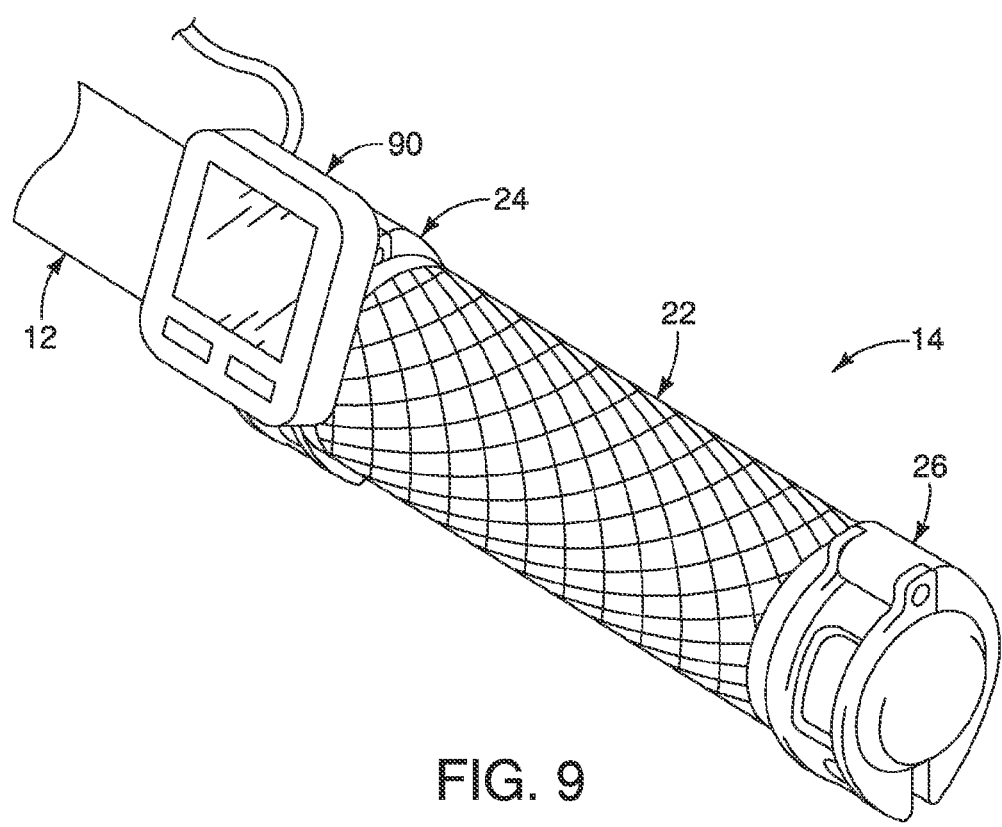
FIG. 9 is an enlarged rear perspective view of the right grip portion of the handlebar and the right bicycle grip assembly illustrated in FIG. 1, with a cycle computer unit mounted to the right grip portion of the handlebar using the inner clamp assembly.
Figure 10:
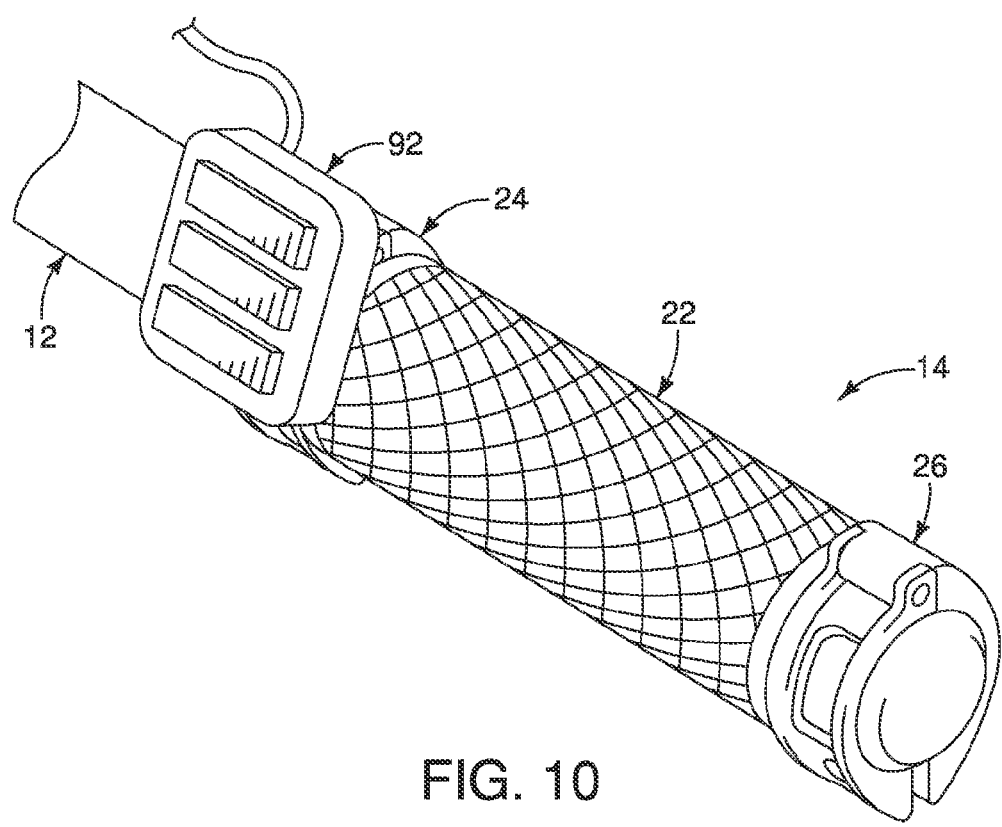
FIG. 10 is an enlarged rear perspective view of the right grip portion of the handlebar and the right bicycle grip assembly illustrated in FIG. 1, with an electric switch unit (e.g., a suspension controller unit) mounted to the right grip portion of the handlebar using the inner clamp assembly.

As seen in FIGS. 9 and 10, the right grip assembly 14 is not limited to supporting the shifter lever unit 18a and the brake lever unit 20a. Rather, the right grip assembly 14 can be used to support other types of bicycle components that are preferably mounted near the handlebar grip 22. For example, a cycle computer unit 90 is mounted to the first fixing member 24 as seen in FIG. 9. Alternatively, for example, an electric switch unit 92 is mounted to the first fixing member 24 as seen in FIG. 10. For example, the electric switch unit is used as a suspension controller unit for an electric control suspension or a shift controller unit for an electric gear shifting system. The cycle computer unit 90 and the electric switch unit 92 are mounted to one of the component attachment structures 58 using one of the fastening bolts 60 in the same manner as the shifter lever unit 18a as discussed above. For an aesthetically pleasing design, the cycle computer unit 90 and the electric switch unit 92 can have a two piece housing that snaps together such that the head of the detachable fastening bolt 60 is hidden within the housing. Of course, other types of attachment configurations are possible.

Figure 11:
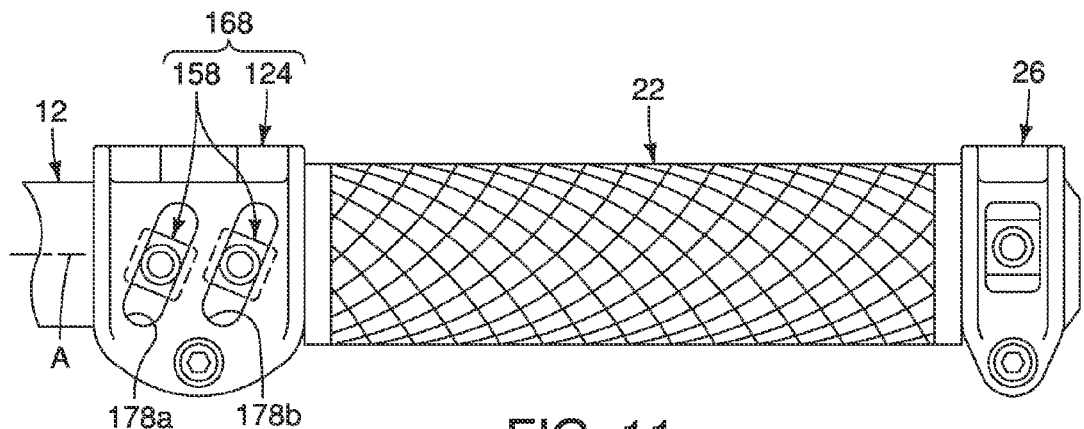
FIG. 11 is a rear elevational view of the right grip portion of the handlebar with an alternate clamp assembly in accordance with a second embodiment for use with the right bicycle grip assembly of the first embodiment.

Referring now to FIG. 11, a fixing member 124 having a plurality of component attachment structures 158 is illustrated that forms an alternate clamp assembly 168 in accordance with a second embodiment. The clamp assembly 168 is used in the right bicycle grip assembly 14 of the first embodiment by replacing the inner clamp assembly 68 with the clamp assembly 168. Thus, the clamp assembly 168 clamps the handlebar grip 22 to the handlebar 12 in the same manner as the first embodiment. In view of the similarity between the first and second embodiments, the descriptions of the parts of the second embodiment that are identical to the parts of the first embodiment may be omitted for the sake of brevity.

Basically, the clamp assembly 168 is identical to the clamp assembly 68 of the first embodiment, except that the clamp assembly 168 is configured to mount two bicycle components in a side by side relationship on each side of the clamp assembly 168, and the bicycle components are adjusted along a spiral path. Thus, the clamp assembly 168 has two openings 178a and 178b that are axially spaced apart from each other in an axial direction relative to the center handlebar mounting axis A of the fixing member 124. The openings 178a and 178b are a partial spirally extending slot that extends in a spiral direction relative to the center handlebar mounting axis A of the fixing member 124. In this way, each of the component attachment structures 158 moves along in a spiral direction relative to the center handlebar mounting axis A of the fixing member 124 such that a bicycle component is simultaneously adjusted in both the axial direction and the circumferential direction relative to the center handlebar mounting axis A of the fixing member 124. The other side (not shown) of the fixing member 124 also preferably has two openings that are axially spaced apart from each other in an axial direction relative to the center handlebar mounting axis A of the fixing member 124 such that one or two bicycle components can be mounted to the other side (not shown) of the fixing member 124.

Figure 12:
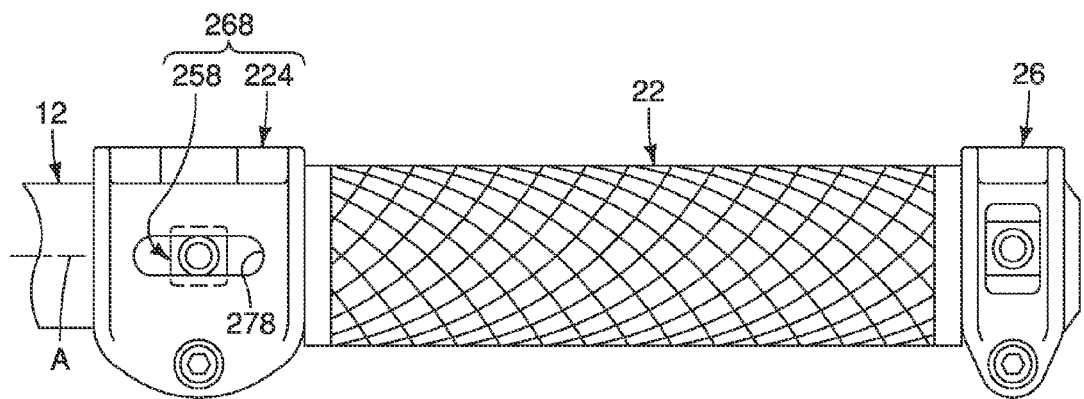
FIG. 12 is a rear elevational view of the right grip portion of the handlebar with an alternate clamp assembly in accordance with a third embodiment for use with the right bicycle grip assembly of the first embodiment.

Referring now to FIG. 12, a fixing member 224 having two component attachment structures 258 (only one shown) is illustrated that forms an alternate clamp assembly 268 in accordance with a third embodiment. The clamp assembly 268 is used in the right bicycle grip assembly 14 of the first embodiment by replacing the inner clamp assembly 68 with the clamp assembly 268. Thus, the clamp assembly 268 clamps the handlebar grip 22 to the handlebar 12 in the same manner as the first embodiment. In view of the similarity between the first and third embodiments, the descriptions of the parts of the third embodiment that are identical to the parts of the first embodiment may be omitted for the sake of brevity.

Basically, the clamp assembly 268 is identical to the clamp assembly 68 of the first embodiment, except that the clamp assembly 268 has two openings 278 (only one shown) that extends in a parallel direction relative to a center handlebar mounting axis A of the fixing member 224. In this way, the component attachment structures 258 move along in a parallel direction relative to the center handlebar mounting axis A of the fixing member 224 such that a bicycle component is adjusted in the axial direction relative to the center handlebar mounting axis A of the fixing member 224.

Figure 13:
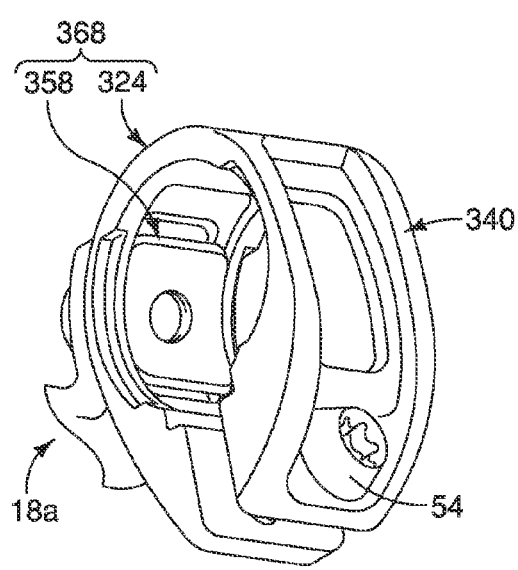
FIG. 13 is a perspective view of an alternate clamp assembly in accordance with a fourth embodiment for use with the right bicycle grip assembly of the first embodiment.

Referring now to FIG. 13, a fixing member 324 having at least one component attachment structure 358 is illustrated that forms an alternate clamp assembly 368 in accordance with a fourth embodiment. The clamp assembly 368 is used in the right bicycle grip assembly 14 of the first embodiment by replacing the inner clamp assembly 68 with the clamp assembly 368. Thus, the clamp assembly 368 clamps the handlebar grip 22 to the handlebar 12 in the same manner as the first embodiment. In view of the similarity between the first and fourth embodiments, the descriptions of the parts of the fourth embodiment that are identical to the parts of the first embodiment may be omitted for the sake of brevity.

Basically, the clamp assembly 368 is identical to the clamp assembly 68 of the first embodiment, except that the clamp assembly 368 has a C shape member 340 instead of the first and second semicircle parts 40 and 42. The C shape member 340 has first and second free ends adjustably connected together by the fastener 54 (i.e., an adjustment structure) that moves the first and second free ends of the C shape member 340 relative to each other. Also while only one of the component attachment structures 358 is illustrated, it will be apparent that two of the component attachment structures 358 can be used with the fixing member 324 as needed and/or desired.

Figure 14:
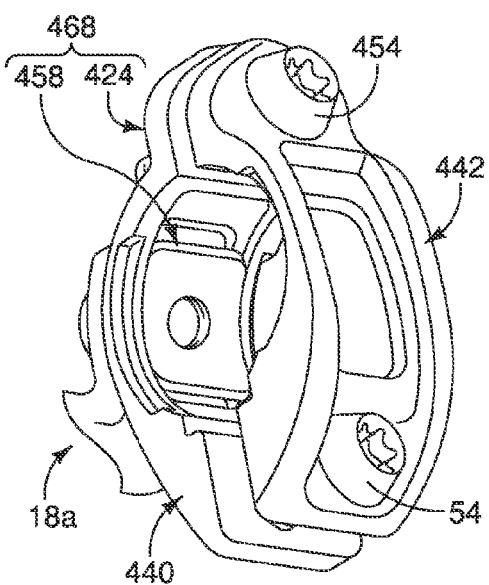
FIG. 14 is a perspective view of an alternate clamp assembly in accordance with a fifth embodiment for use with the right bicycle grip assembly of the first embodiment.

Referring now to FIG. 14, a fixing member 424 having at least one component attachment structure 458 is illustrated that forms an alternate clamp assembly 468 in accordance with a fifth embodiment. The clamp assembly 468 is used in the right bicycle grip assembly 14 of the first embodiment by replacing the inner clamp assembly 68 with the clamp assembly 468. Thus, the clamp assembly 468 clamps the handlebar grip 22 to the handlebar 12 in the same manner as the first embodiment. In view of the similarity between the first and fifth embodiments, the descriptions of the parts of the fifth embodiment that are identical to the parts of the first embodiment may be omitted for the sake of brevity. The first and second semicircle parts.

Basically, the clamp assembly 468 is identical to the clamp assembly 68 of the first embodiment, except that the clamp assembly 468 has first and second semicircle parts 440 and 442 in which first ends are adjustably connected together by the fastener 54 (i.e., a first fastener) and second ends are adjustably connected together by a fastener 454 (i.e., a second fastener). Also while only one of the component attachment structure 458 is illustrated, it will be apparent that two of the component attachment structures 458 can be used with the fixing member 424 as needed and/or desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "generally", "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A clamp assembly for fixing a handlebar grip to a handlebar, the clamp assembly comprising:
   a fixing member configured to be mounted on the handlebar, the fixing member defining a center handlebar mounting axis and having:
      at least one mating grip locking structure,
      a component attachment structure,
      an annular shape having an inner area arranged to receive the handlebar,
      a first opening extending between an inner surface and an outer surface of the fixing member, the first opening being a circumferentially extending slot relative to the center handlebar mounting axis of the fixing member, the component attachment structure being configured to be selectively at least partially disposed in the first opening,
      a second opening extending between the inner surface and the outer surface of the fixing member, the second opening being a circumferentially extending slot relative to the center handlebar mounting axis of the fixing member, the component attachment structure being configured to be selectively at least partially disposed in the second opening, the second opening being circumferentially spaced apart from the first opening in a circumferential direction relative to the center handlebar mounting axis of the fixing member,
      a first semicircle part and a second semicircle part, the first and second semicircle parts having first ends that are hinged together and second ends that are adjustably connected together by a fastener,
   and
   a side edge surface with a recess that is a part of the mating grip locking structure, the recess of the side edge surface and the first opening being aligned with each other along a direction parallel to the center handlebar mounting axis, the first opening being disposed at the first semicircle part and the second opening being disposed at the second semicircle part.

2. The clamp assembly according to claim 1, wherein the component attachment structure includes a base portion disposed in the inner area and a component attachment portion aligned with the first opening extending between the inner and outer surfaces of the fixing member.

3. The clamp assembly according to claim 2, wherein the component attachment portion protrudes outwardly from the base portion and is at least partially disposed in the first opening.

4. The clamp assembly according to claim 2, wherein the component attachment structure is movably disposed relative to the first opening of the fixing member with the component attachment portion accessibly aligned at different positions through the first opening.

5. The clamp assembly according to claim 2, wherein
the fixing member includes an additional component attachment structure including a base portion and a component attachment portion, the base portion of the additional component attachment structure being disposed in the inner area and the component attachment portion of the additional component attachment member being aligned with the second opening extending between the inner and outer surfaces of the fixing member.

6. The clamp assembly according to claim 2, wherein
the inner surface of the fixing member includes a second recess that limits rotational movement of the base portion relative to the fixing member about the component attachment portion.

7. A bicycle grip assembly comprising:
a handlebar grip having a tubular portion having a first end and a second end, at least one of the first and second ends including at least one first mating grip locking structure; and
a fixing member configured to be mounted on a bicycle handlebar, the fixing member having at least one second mating grip locking structure and a component attachment structure, the at least one second mating grip locking structure mating with the first mating grip locking structure of the handlebar grip to fix the handlebar grip to the bicycle handlebar,
the fixing member defining a center handlebar mounting axis and having:
an annular shape having an inner area arranged to receive the handlebar,
a first opening extending between an inner surface and an outer surface of the fixing member, the component attachment structure being configured to be selectively at least partially disposed in the first opening,
a second opening extending between the inner surface and the outer surface of the fixing member, the component attachment structure being configured to be selectively at least partially disposed in the second opening, the second opening being circumferentially spaced apart from the first opening in a circumferential direction relative to the center handlebar mounting axis of the fixing member,
a first semicircle part and a second semicircle part, the first and second semicircle parts having first ends that are hinged together and second ends that are adjustably connected together by a fastener, and
a side edge surface with a recess that is a part of the at least one first mating grip locking structure, the recess of the side edge surface and the first opening being aligned with each other along a direction parallel to the center handlebar mounting axis,
the first opening being disposed at the first semicircle part and the second opening is disposed at the second semicircle part.

8. The bicycle grip assembly according to claim 7, further comprising
at least one bicycle component selected from a group consisting of a shifter lever unit, a brake lever unit, a suspension controller unit, an electric switch unit and a cycle computer unit.

9. The bicycle grip assembly according to claim 8, wherein
the component attachment structure includes a base portion disposed in the inner area and a component attachment portion aligned with the first opening extending between the inner and outer surfaces of the fixing member.

10. The bicycle grip assembly according to claim 9, wherein
the component attachment portion protrudes outwardly from the base portion and is at least partially disposed in the first opening.

11. The bicycle grip assembly according to claim 9, wherein
the component attachment structure is movably disposed relative to the first opening of the fixing member with the component attachment portion accessibly aligned at different positions through the first opening.

12. The bicycle grip assembly according to claim 11, wherein
the first opening is a circumferentially extending slot relative to the center handlebar mounting axis of the fixing member.

13. The bicycle grip assembly according to claim 11, wherein
the first opening is a partial extending slot that extends at an angle with respect to a normal direction of the center handlebar mounting axis of the fixing member.

14. The bicycle grip assembly according to claim 11, wherein
the first opening is a slot that extends in a parallel direction relative to the center handlebar mounting axis of the fixing member.

15. The bicycle grip assembly according to claim 9, wherein
the fixing member includes an additional component attachment structure including a base portion and a component attachment portion, the base portion of the additional component attachment structure being disposed in the inner area and the component attachment portion of the additional component attachment member being aligned with the second opening extending between the inner and outer surfaces of the fixing member.

16. The bicycle grip assembly according to claim 9, wherein
the inner surface of the fixing member includes a second recess that limits rotational movement of the base portion relative to the fixing member about the component attachment portion.

* * * * *